United States Patent Office 3,384,174
Patented May 21, 1968

3,384,174
CONSOLIDATION OF SUBTERRANEAN
FORMATIONS
Gerould H. Smith, Santa Ana, Calif., assignor to Union
Oil Company of California, Los Angeles, Calif., a corporation of California
No Drawing. Filed Sept. 26, 1966, Ser. No. 581,767
18 Claims. (Cl. 166—33)

This invention relates generally to the treatment of incompetent subterranean formations, and more particularly, to an improved method for consolidating incompetent clay-containing earth formations. Specifically, the invention provides a new and efficient process of treating unconsolidated earth masses with hardenable resin to form a consolidated structure having high strength and retaining a substantial degree of porosity and permeability.

Recoverable fluids, such as petroleum oil, gas and water, are frequently found in subterranean formations comprising unconsolidated or loosely consolidated sand and sandstone. When such incompetent formations are pierced by a well bore and the connate fluids therein removed, the loose or weakly bound sand particles become dislodged and are entrained in the fluid. Some of the dislodged sand accumulates in the well bore and other flow areas causing plugging and reduced fluid flow, while other of the sand is carried to the surface with the withdrawn fluid. These entrained particles cause severe erosion of underground strainers and liners, the producing string, pressure control valves, pumps and flow lines. Substantial quantities of the entrained sand are deposited in field storage tanks causing cleaning and disposal problems. In extreme cases, sufficient sand can be removed from the producing formation to create large underground voids, or cavities, which can collapse under the over-burden pressure causing damage to the well. Thus, fluid production from incompetent subterranean formations can result in restricted flow and increased production and well maintenance costs, unless the entrainment of sand from the formation can be controlled or completely eliminated.

Various sand control measures, including a number of consolidation methods, have been employed in an effort to contain incompetent sand within a producing formation. The consolidation of subterranean fluid producing formations with resin or plastic binders has been previously proposed. In general, the prior art resin consolidation methods comprise the injection of a resin-forming monomer or prepolymer, or a liquid solution of these materials, directly into the formation. These resin-forming materials are conventionally referred to in the well treating art as resins or plastics even though they have not been cured to a resinous state prior to injection. The resin monomer or prepolymer is then polymerized, or hardened, by the effect of temperature alone, or a curing agent can be admixed with the liquid resin or resin solution to catalyze the polymerization reaction. Alternatively, the curing agent can be separately injected as a second solution either preceding or following the injection of the resin.

One conventional plastic sand consolidation process comprises treatment of the incompetent sands with resins of the phenol-formaldehyde type. The resins of this type are formed by reacting formaldehyde or formalin with an aryl hydroxy compound, such as phenol or cresol, in the presence of a catalyst. Suitable catalysts comprise water-soluble acids, or bases, or mixtures of stannous chloride and an acid. Where the reactants are to be injected as the components of a solution, the phenol and the formaldehyde must be partially reacted to form an oily liquid phase in which the reactants, the partially cured resin and the catalyst are mutually soluble.

Another sand consolidation process finding wide acceptance comprises treatment of the formation with epoxy resins. The epoxy resins suitable for use in the epoxy consolidation process are well known, and are commercially available, a common class being the diglycidyl ethers of bisphenol A obtained by reacting epichlorohydrin with bisphenol A in the presence of caustic such as sodium hydroxide or potassium hydroxide. Generally, the epoxy resins are obtained as a mixture of monomeric epoxides and of polymeric polyepoxides. As is known in the art, by correlation of the proportions of epichlorohydrin, bisphenol A and caustic, the degree of polymerization can be controlled accordingly. Also, as is known in the art, halohydrins other than epichlorohydrin, such as 1,2-dichloro-3-hydroxypropane and dichlorohydrin, can be used. Similarly, in place of bisphenol A there can be used mononuclear di- and trihydroxy phenols, such as resorcinol, hydroquinone, pyrocatechol, and phloroglucinol; polynuclear polyhydroxy phenols, such as 4,4'-dihydroxy diphenyl methane, trihydroxy diphenyl dimethyl methane, and 4,4'-dihydrory biphenyl. Other useful epoxy resins for sand consolidation include the condensation products of epichlorohydrin with polynuclear polyhydroxy phenols, also known as the epoxy novolac resins.

The epoxy resin is injected into the formation as a relatively low viscosity liquid, which can be diluted with a solvent if necessary, and then polymerized into a hardened mass by the action of temperature in the presence of a curing agent. A number of curing agents, or catalysts, are suggested in the art to harden the resin. These include amines, dibasic acids, and acid anhydrides. A preferred class of curing agents for use with epoxy resins are the amines, including primary, secondary, or tertiary amines and mixtures thereof. Exemplary of these agents are the primary amines, such as diethylene triamine, ethylene diamine, triethylene tetramine, dimethylamino propylamine, and diethylamino propylamine; cyclic aliphatic amines, such as piperidine, methane diamine; tertiary amines, aliphatic or aromatic substituted derivatives, such as triethylamine, benzyl dimethylamine, dimethylamino methyl phenol, tridimethyl amino methyl phenol and α-methylbenzyl dimethylamine; aromatic amines, such as meta-xylylene diamine, 4,4'-methylene dianiline, and pyridine. As indicated, a mixture of the various amines is preferred. A mixture of primary and tertiary amines is even more preferred. This can be a physical mixture of two or more compounds, such as benzyl dimethylamine and diethylene triamine; or a single compound containing both primary and tertiary amine groups, as typified by dimethyl aminopropyl amine.

The problem of consolidating a sand by means of a plastic coating, such as the aforementioned phenol-formaldehyde and epoxy resins, is complicated and difficult. The majority of the sands are water wet and their pores contain droplets of oil surrounded by water which are in contact with the earth particles. The connate water in the sands is usually alkaline; and basic mineral materials, such as carbonates, often comprise a significant portion of whatever naturally occurring cementing materials exist between the grains of the sand. The unconsolidated sands are encountered at widely varying depths and exist at temperatures ranging from about 90° F. to 350° F. The variations in the depth of the sand, as well as the variations in the permeability, and in the size of tubing strings installed in the well interact to create wide variations in the time involved in pumping a liquid from a surface location into a sand encountered by the well, thus complicating the control of the necessary injections.

Nevertheless, several commercial sand consolidation processes employing the aforementioned resin treatments have been developed which have enjoyed substantial success, particularly in clean sands, i.e., sands which contain little or no clay. However, these processes have not produced satisfactory treatments in formations having relatively high clay contents, such as those having clay contents above about 5 percent. Various clayey materials are highly adsorbent and preferentially adsorb the curing agents or catalysts from the resin catalyst mixtures, rendering them unavailable for catalysis of the injected resin. Insufficient catalyst results in the polymerization being wholly or partially incomplete, thereby weakening the consolidated structure sufficiently that sand production is at best only temporarily alleviated. Since many extensive petroleum reservoirs occur in incompetent formations having clay contents up to 40 percent, or higher, such as encountered in the Louisiana-Gulf Coast area, as well as elsewhere, present commercial consolidation processes are largely ineffective in producing satisfactory consolidation of these formations.

Accordingly, it is an object of the present invention to provide a resin consolidation process useful in consolidating an incompetent earth formation containing clay. Another object is to provide a method for pre-treating high clay content earth formations so as to render them amenable to consolidation by resin treatment. Another object of the invention is to provide a method for forming permeable, high strength consolidated earth structures in incompetent formations containing adsorbent clayey materials. These and other objects of the invention will be apparent from the following detailed description thereof.

Briefly, the invention comprises a method of consolidating incompetent earth formations which contain relatively high proportions of clayey materials with liquid resin injected into the formation and then hardened by the action of a curing agent or catalyst otherwise adsorbable by the clays. Prior to the injection of resin or resin-catalyst mixtures into the earth formation, these clayey materials are rendered inert to the adsorbable catalysts by first treating the formation with a liquid solution of an alkylphenoxy polyethoxy ethanol in sufficient quantity to satisfy the adsorption capacity of the clay. The alkylphenoxy polyethoxy ethanol is adsorbed on the surfaces of the clay particles sufficiently to render the clay wholly or partially nonadsorbent for the subsequently injected catalyst. Thus, the catalyst remains in solution with the resin and is available for catalysis of the polymerization reaction. In a preferred embodiment of the invention, the earth formation in the consolidation zone is first treated with successive solvent injections to remove connate oil and water.

It has been unexpectedly found that by this special technique one can treat unconsolidated earth formations to convert them into consolidated masses having a high degree of porosity and the success of the treatment is not impaired by the presence of clay in proportions that impede consolidations by resin-forming materials applied by conventional technique. The above-described process is particularly suited for the treatment of formations surrounding injection wells or production wells for the recovery of petroleum from a petroleum reservoir. It may also be used in consolidating formations surrounding mine shafts or in consolidating earth formations for filtration purposes. Although any incompetent earth particles can be consolidated by the method of this invention, whether or not they contain clayey materials, the advantages of the process are realized when the formation to be consolidated has a sufficiently high content of adsorbent clay to adversely affect the resin curing reaction. Since various clays exhibit a greater or lesser absorptivity, the extent of the resin degradation depends upon both the types and quantity of clay encountered. The method of this invention has been successfully demonstrated in consolidating earth particles which are substantially completely comprised of highly adsorbent clayey materials.

In the practice of this invention, a volume of liquid solution of alkylphenoxy polyethoxy ethanol is first injected into the formation, followed by subsequent injections of resins and/or catalyst, or resin-catalyst mixtures. While the exact mechanism by which the polyethoxy ethanol is adsorbed from solution and becomes bonded to the clay is not known, it has been demonstrated that alkylphenoxy polyethoxy ethanols are irreversibly adsorbed by the clay in an amount related to the base exchange capacity of the clay. The base exchange capacity of a soil particle is defined as the milliequivalents of exchangeable cations per 100 grams of soil particles. The base exchange capacities of soil particles range from 0 for quartz and sand to as high as 100 meg./100 gms. for certain of the clays. The various resin-curing catalysts are not adsorbed to any appreciable extent by earth particles having a 0 base exchange capacity and are adsorbed to a significant extent by those materials having high base exchange values. The adsorption of catalyst is reduced or completely eliminated by first treating the earth particles with sufficient of the alkylphenoxy polyethoxy ethanol to satisfy the base exchange capacity of the clay. While the exact mechanism of this treatment is not known, it is believed that the alkylphenoxy polyethoxy ethanol is adsorbed from solution by the clay particles and becomes attached thereto by the solubility of the oxygen members of the ether and hydroxyl groups in the silicate surface of the clay, and also by hydrogen bond formation between the numerous hydrogen atoms of the adsorbate and the hydroxyl groups, oxygen ions, and molecularly adsorbed crystalline water on the clay surface. This mechanism effects substantially complete coating of the exposed clay surfaces to a thickness of at least one monomolecular layer, thereby rendering the clay inert to the subsequently injected catalysts without otherwise causing an appreciable loss in permeability. The coating is permanently bonded to the clay surfaces by the relatively strong chemical attraction, and is not removed or displaced by contact with solvents or other well treating fluids.

The alkylphenoxy polyethoxy ethanols useful in desensitizing the clayey constituents of an earth formation prior to resin consolidation according to the method of this invention are relatively long chain alkyl aryl polyether alcohols comprising both alkyl aryl and polyoxyethylene members according to the following generalized equation:

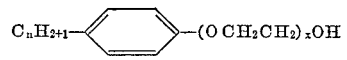

wherein $n$ is an integer between 4 and 12 and wherein $x$ is an integer between 1 and about 30. Compounds of the class are soluble in polar organic solvents such as alcohols, glycols, ethers, ketones, etc. Both the water solubility of the alkylphenoxy polyethoxy ethanols and the permanency and effectiveness of the coating increases as the length of the polyoxyethylene chain is increased. Since it is sometimes desired to inject the alkylphenoxy polyethoxy ethanol into the formation as an aqueous solution, it is preferred that the compound be soluble in water. Accordingly, the alkylphenoxy polyethoxy ethanols preferred for use in aqueous solution are characterized by polyoxyethylene chains of sufficient length to render them water soluble. Specifically, compounds having at least 7 ether oxygens in the polyoxyethylene chain are preferred.

Among the alkylphenoxy polyethoxy ethanols particularly useful in the practice of this invention are compounds according to the above generalized formula wherein $n$ is the integer 8 or 9, and wherein $x$ is an integer between about 7 and 30. These compounds are commercially available octyl and nonylphenoxy polyethoxy ethanols prepared by the reaction of octylphenol or nonylphenol and ethylene oxide. Compounds particularly preferred in the practice of this invention are octylphenoxy polyethoxy ethanols having 9 or 10 oxygen atoms in the polyoxyethylene chain as characterized by the following formula:

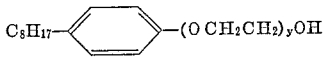

wherein $y$ is the integer 9 or 10. Mixtures of alkylphenoxy polyethoxy ethanols having different polyoxyethylene chain lengths are also preferred for the desensitization of clay containing formations. Especially preferred is a mixture of octylphenoxy polyethoxy ethanols having 9 and 10 member polyoxyethylene chains according to the foregoing generalized formula.

In treating incompetent subterranean earth formations according to my invention, any convenient method of injecting fluids into the zone to be consolidated can be utilized. The choice of injection techniques will depend primarily on the type and placement of subsurface casings, liners and tubing strings, the type of production equipment, the injection equipment available to the operator, and the experience of the operator. Conventionally, the zone to be treated is isolated by setting mechanical packers in the well bore above and below the consolidation zone. The vertical depth of formation to be consolidated can be controlled by the spacing between these packers. Generally, the zone to be treated can comprise a formation from about 2 to about 50 feet in vertical thickness, although it is preferred to treat a zone having a thickness of not more than 10 feet in a single injection step. Treatment of successive vertical layers of formation may be desirable in the case where a thick zone of incompetent sand is to be consolidated.

Because of the expense and time required to treat an incompetent formation, consolidation of only sufficient sand immediately adjacent the well bore to prevent displacement of the loose sand particles is preferred. Consolidated of the incompetent zone to a lateral distance of from about 1 to about 10 feet from the well bore is usually adequate; although, in any particular formation consolidation to a greater horizontal penetration can be advantageous. In most applications, consolidation to a horizontal distance of from about 3 to about 6 feet from the well is preferred. Although the preferred configuration of the consolidated zone can be defined as a cylinder symmetrically oriented about the well bore, because of differences in permeability, and because of differences in the vertical and horizontal injectivity profile, and due to the effect of hydrostatic head, the actual consolidated zone will be somewhat irregular in shape. The assumption that the consolidated zone is a regular cylinder having a height equal to the desired depth of penetration is sufficiently accurate for computation of the required treating volumes, etc. The volume of fluid required to fill the consolidation zone is the pore or interstitial volume defined by this cylinder.

When the unconsolidated mass contains connate water, i.e., liquid water adhering to the earth particles due to capillary forces, and/or hydrocarbons such as oil, as is usually the case with petroleum sands, it is generally desirable to first remove such connate water and hydrocarbons before contacting the mass with the resin-catalyst mixture. A preferred technique for removing the water includes treatment of the mass with water removing fluids; such as, for example, oxygenated hydrocarbon compounds containing at least one keto-oxygen and/or hydroxyl group. Examples of such materials include, among others, isopropyl alcohol, n-propyl alcohol, secondary butyl alcohol, acetone, methylethyl ketone, and the like, and mixtures of these water removing fluids. One particularly preferred oxygenated hydrocarbon is isopropyl alcohol. Usually the water and oil are adequately removed by the injection of a water and oil miscible liquid such as a lower alcohol, but in some cases, it is desirable to precede the alcohol slug with a slug of liquid hydrocarbon such as diesel.

A solution of the alkylphenoxy polyethoxy ethanol in a polar solvent can be added to a final portion of the water-removing oxygenated compound injected into the formation, or alternatively, can be injected as a separate liquid slug immediately following the solvent injection. Polar solvents suitable for this purpose include water, brine and organic polar solvents such as alcohols, glycols, ethers, ketones, etc. Particularly preferred are oxygenated hydrocarbon compounds containing at least one keto-oxygen or hydroxyl group. Examples of these compounds include isopropyl alcohol, n-propyl alcohol, secondary butyl alcohol, acetone, methylethyl ketone, and the like. In another aspect, the same material can be employed as solvent for the alkylphenoxy polyethoxy ethanol and as water-removing fluid. Although the maximum concentration of the agent is dependent upon its solubility, it is preferred that the material be employed in rather dilute concentration, such as a 0.01 to 10 weight percent of the coating agent in solvent. The coating composition can be successfully injected in up to 18 weight percent brine; formation water being a particularly preferred injection vehicle.

Further, it has been discovered that superior results are obtained when the solution of alkylphenoxy polyethoxy ethanol is followed immediately with an additional quantity of oxygenated hydrocarbon compound prior to injection of the resin-forming material.

Recommended practice with most of the consolidation plastics commercially available includes pretreatment of the formation with an organic solvent immediately prior to the resin injection. Accordingly, where desired, the method of this invention includes the optional step of contacting the formation particles with an organic solvent after treatment with alkylphenoxyl polyethoxy ethanol or the subsequently injected oxygenated hydrocarbon compound and prior to injection of the resin.

Thus, a preferred mode of practicing the method of this invention for consolidating incompetent petroleum bearing earth formations comprises (1) the injection of a quantity of hydrocarbon liquid, such as diesel, through said well bore and into said formation; (2) next injecting a quantity of an oxygenated hydrocarbon liquid; (3) admixing a solution of alkylphenoxy polyethoxy ethanol into a final portion of the oxygenated hydrocarbon liquid; (4) injecting an additional quantity of oxygenated hydrocarbon liquid; (5) injecting a quantity of aromatic solvent; (6) injecting the resin-forming material; and (7) displacing these fluids from the well bore and into the formation. The well is then maintained shut in for sufficient time to permit curing of the resin, whereupon production can be resumed in conventional manner. The specific quantities of wash solution employed are a matter of choice depending upon the particular application, but usually the volume of the diesel and oxygenated hydrocarbon solvent washes is between about 1.0 and about 5.0 pore volumes, with a lesser amount of oxygenated hydrocarbon after flush being preferred, and usually less than about 1.0 pore volume.

The improved consolidation method of this invention is demonstrated by the following examples which are presented by way of illustration, and are not intended as limiting the spirit and scope of the invention as defined by the appended claims.

EXAMPLE 1

A series of tests are performed to demonstrate the adsorption of alkylphenoxy polyethoxy ethanol from aqueous solution by various earth materials. Adsorption at various concentration levels from distilled water and brine by quartz, kaolinite, sodium montmorillonite, calcium montmorillonite, attapulgite and illite is determined.

The test procedure comprises adding a measured volume of a solution of mixed octylphenoxy polyethoxy ethanol having 9 and 10 ethoxy groups per molecule to equal weight quantities of mineral in a small vial. The particular octylphenoxy polyethoxy ethanol employed is a commercially available proprietary material marketed by the Rohm and Haas Company under the trade name Triton X-100. The samples are shaken and then let stand for about 12 hours. The supernatant solution is removed, either by centrifugation or decantation, and the final octylphenoxy polyethoxy ethanol content determined by spectrophotoanalysis using ultraviolet light adsorption. The amount of octylphenoxy polyethoxy ethanol adsorbed is calculated by difference for each determination. These tests demonstrate that alkylphenoxy polyethoxy ethanol is adsorbed from aqueous solution in varying amounts by different earth materials. The results of these tests are reported in Table I.

TABLE I.—ADSORPTION OF OCTYLPHENOXY POLYETHOXY ETHANOL FROM AQUEOUS SOLUTIONS BY VARIOUS EARTH MATERIALS

| Original Concentration of Adsorbate, weight percent | Solvent | Earth Material | Percent of Adsorbate Removed from Solution |
|---|---|---|---|
| 0.1 | Water | Quartz | Negligible. |
| 0.1 | do | Kaolinite | Do. |
| 0.1 | do | Illite | 89. |
| 0.1 | do | Attapulgite | 95. |
| 0.1 | do | Calcium montmorillonite. | 100. |
| 0.1 | do | Sodium montmorillonite. | 100. |

The amount of the octylphenoxy polyethoxy ethanol adsorbed from solution by the various minerals is compared with the base exchange capacity of the mineral in Table II.

TABLE II.—COMPARISON OF THE ADSORPTION OF OCTYLPHENOXY POLYETHOXY ETHANOL BY VARIOUS MINERALS WITH THEIR BASE EXCHANGE CAPACITIES

| Mineral | Weight Ratio of Adsorbate/Mineral | Base Exchange Capacity meq./100 ml. |
|---|---|---|
| Quartz | 1.6 | |
| Kaolinite | 1.6 | 3 |
| Muscovite | 2.8 | 1 |
| Illite | 19 | 16 |
| Attapulgite | 19 | 35 |
| Calcium montmorillonite | 57 | 60 |
| Sodium montmorillonite | 65 | 64 |

It is apparent from the foregoing data that increased quantities of alkylphenoxy polyethoxy ethanol are adsorbed by earth materials exhibiting higher base exchange capacities and that the amount adsorbed is generally proportional to the base exchange capacity.

EXAMPLE 2

The consolidation of a clay-containing subterranean formation can be demonstrated by the following test. A simulated core of incompetent earth particles is prepared by packing a mixture of 44 parts by weight Nevada 130 sand, 49 parts by weight Nevada 70 sand and 7 parts by weight of finely divided montmorillonite clay into a Hassler sleeve. Formation conditions are simulated by subjecting the core to an overburden pressure of 2000 p.s.i.g. applied externally of the sleeve and saturating the core with brine. Brine saturation is achieved by evacuating the core while maintaining the external pressure, and then flooding the evacuated core with 3 percent brine solution.

The simulated core is consolidated by the following successive flood treatments:
(1) 100 ml. of diesel,
(2) 100 ml. of isopropyl alcohol,
(3) 9 ml. of an aqueous 0.5 weight percent solution of mixed octylphenoxy polyethoxy ethanol having 9 and 10 ethoxy groups per molecule. This material is a commercially available proprietary material marketed by the Rohm and Hass Company under the trade name Triton X-100,
(4) 35 ml. of isopropyl alcohol, and
(5) 35 ml. of an epoxy resin-catalyst mixture.

The resin impregnated core is cured at 140° F. After curing, the core is removed from the sleeve and observed to be consolidated into a solid mass exhibiting high strength and good permeability.

While particular embodiments of the invention have been described, it will be understood, of course, that the invention is not limited thereto since many modifications can be made and it is intended to include within the invention any such modifications as fall within the scope of the claims.

The invention having thus been described, I claim:
1. A method for consolidating incompetent earth formations containing clayey constituents, which comprises:
   contacting said earth formation with a solution of an alkylphenoxy polyethoxy ethanol;
   subsequently contacting said earth formation with a hardenable, resin-forming material; and
   curing said resin-forming material to obtain a consolidated mass of earth particles.
2. The method defined in claim 1 wherein said alkylphenoxy polyethoxy ethanol contains at least 7 ether oxygens.
3. The method defined in claim 1 wherein said alkylphenoxy polyethoxy ethanol is selected from the group consisting of octylphenoxy polyethoxy ethanol and nonylphenoxy polyethoxy ethanol.
4. The method defined in claim 1 wherein said alkylphenoxy polyethoxy ethanol is a mixture of octylphenoxy polyethoxy ethanol having 9 ethoxy groups per molecule and octylphenoxy polyethoxy ethanol having 10 ethoxy groups per molecule.
5. The method defined in claim 1 wherein said solution of alkylphenoxy polyethoxy ethanol is an aqueous solution.
6. The method defined in claim 1 wherein said solution comprises alkylphenoxy polyethoxy ethanol dissolved in brine.
7. The method defined in claim 1 wherein said solution comprises alkylphenoxy polyethoxy ethanol dissolved in a polar organic solvent.
8. The method defined in claim 1 wherein said solution contains between about 0.01 and 10.0 weight percent of said alkylphenoxy polyethoxy ethanol.
9. A method for consolidating incompetent subterranean clay-containing formations penetrated by a well, which comprises:
   injecting a solution of alkylphenoxy polyethoxy ethanol through said well and into said formation;
   subsequently injecting a hardenable resin-forming material through said well and into said formation; and
   curing said resin-forming material to obtain a consolidated mass of earth particles.
10. The method defined in claim 9 wherein said alkylphenoxy polyethoxy ethanol is selected from the group consisting of octylphenoxy polyethoxy ethanol and nonylphenoxy polyethoxy ethanol.
11. The method defined in claim 10 wherein said alkylphenoxy polyethoxy ethanol contains at least 7 ether oxygen atoms per molecule.
12. The method defined in claim 9 wherein said alkylphenoxy polyethoxy ethanol is a mixture of octylphenoxy polyethoxy ethanol having 9 ethoxy groups per molecule and octylphenoxy polyethoxy ethanol having 10 ethoxy groups per molecule.
13. The method defined in claim 9 wherein said solution contains between about .01 and 10.0 weight percent of said alkylphenoxy polyethoxy ethanol.
14. The method defined in claim 9 wherein an amount of said alkylphenoxy polyethoxy ethanol in excess of the amount required to satisfy the base exchange capacity of the clay is injected into the formation.

15. In the method of consolidating incompetent clay-containing earth formations with a resin-forming material wherein the hardening of the resin is promoted by a polymerization catalyst subject to adsorption from the resin-forming mixture by the clay, the improvement which comprises contacting said formation with a solution of alkylphenoxy polyethoxy ethanol prior to contacting said formation with said resin-forming material so as to coat said clay particles with said alkylphenoxy polyethoxy ethanol, thereby inhibiting the adsorption of catalyst by said clay.

16. A method for consolidating incompetent petroleum bearing clay-containing formations penetrated by a well through which said petroleum is withdrawn, which comprises:

sequentially injecting the following fluids into said well,
- (1) a volume of liquid hydrocarbon,
- (2) a volume of oxygenated organic solvent,
- (3) a volume of 0.01 to 10.0 weight percent solution of alkylphenoxy polyethoxy ethanol dissolved in a polar solvent,
- (4) an additional volume of an oxygenated organic solvent,
- (5) a volume of liquid resin-forming material containing a catalyst to promote the polymerization of said resin-forming material, said catalyst being adsorbed by the clay,
- (6) a volume of inert liquid sufficient to displace the other of said fluids into said formation;

closing said well to permit said resin-forming material to harden; and producing petroleum from said formation through said well.

17. The method defined in claim 16 wherein said alkylphenoxy polyethoxy ethanol is a mixture of octylphenoxy polyethoxy ethanol having 9 ethoxy groups per molecule and octylphenoxy polyethoxy ethanol having 10 ethoxy groups per molecule.

18. The method defined in claim 16 wherein said resin-forming material is epoxy resin.

References Cited

UNITED STATES PATENTS

| | | | |
|---|---|---|---|
| 3,047,067 | 7/1962 | Williams et al. | 166—33 |
| 3,123,137 | 3/1964 | Young et al. | 166—33 |
| 3,176,769 | 4/1965 | Treadway et al. | 166—33 |
| 3,199,590 | 8/1965 | Young | 166—33 |
| 3,339,633 | 9/1967 | Richardson | 166—33 |

STEPHEN J. NOVOSAD, *Primary Examiner.*